United States Patent Office 3,606,085
Patented Sept. 20, 1971

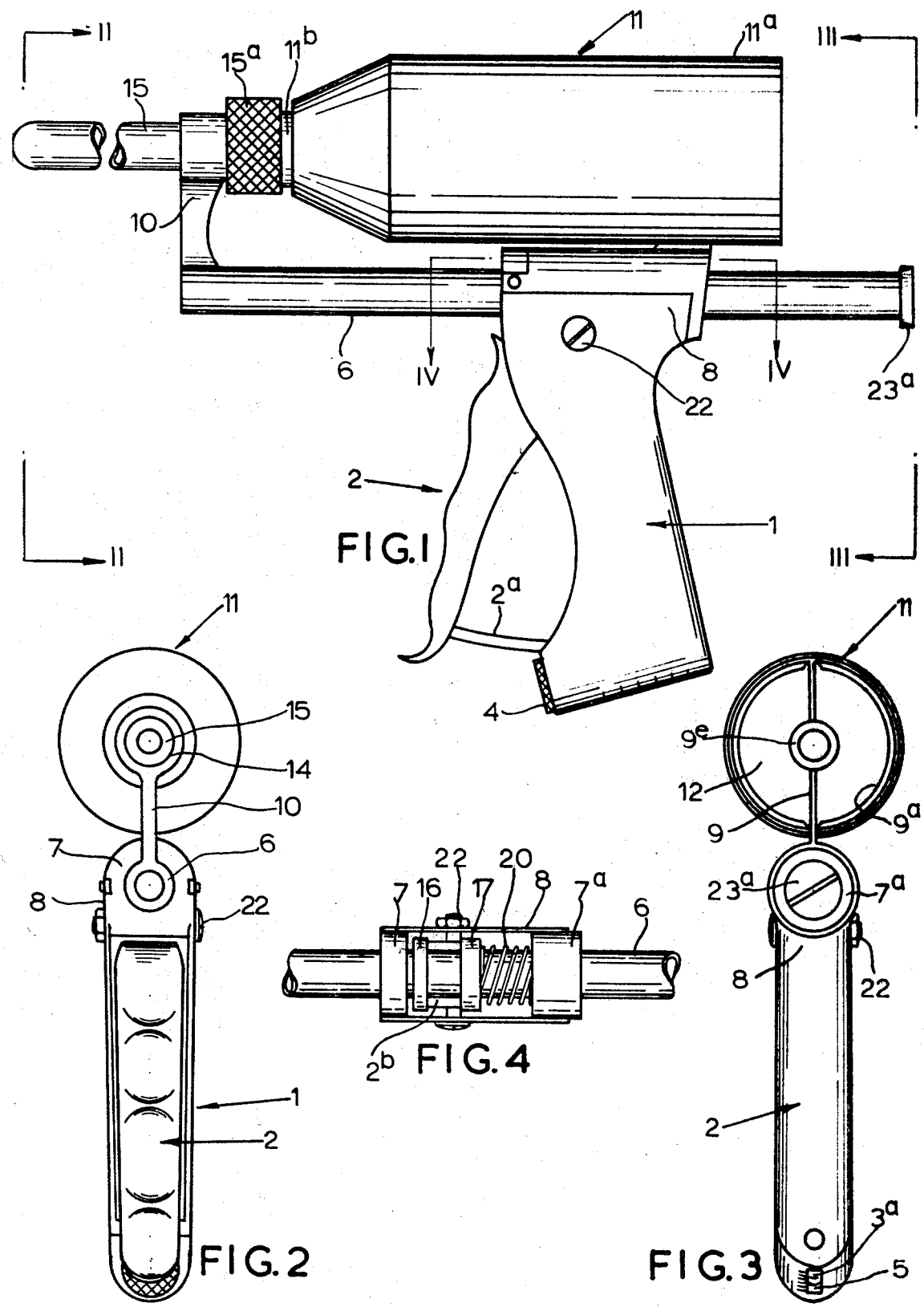

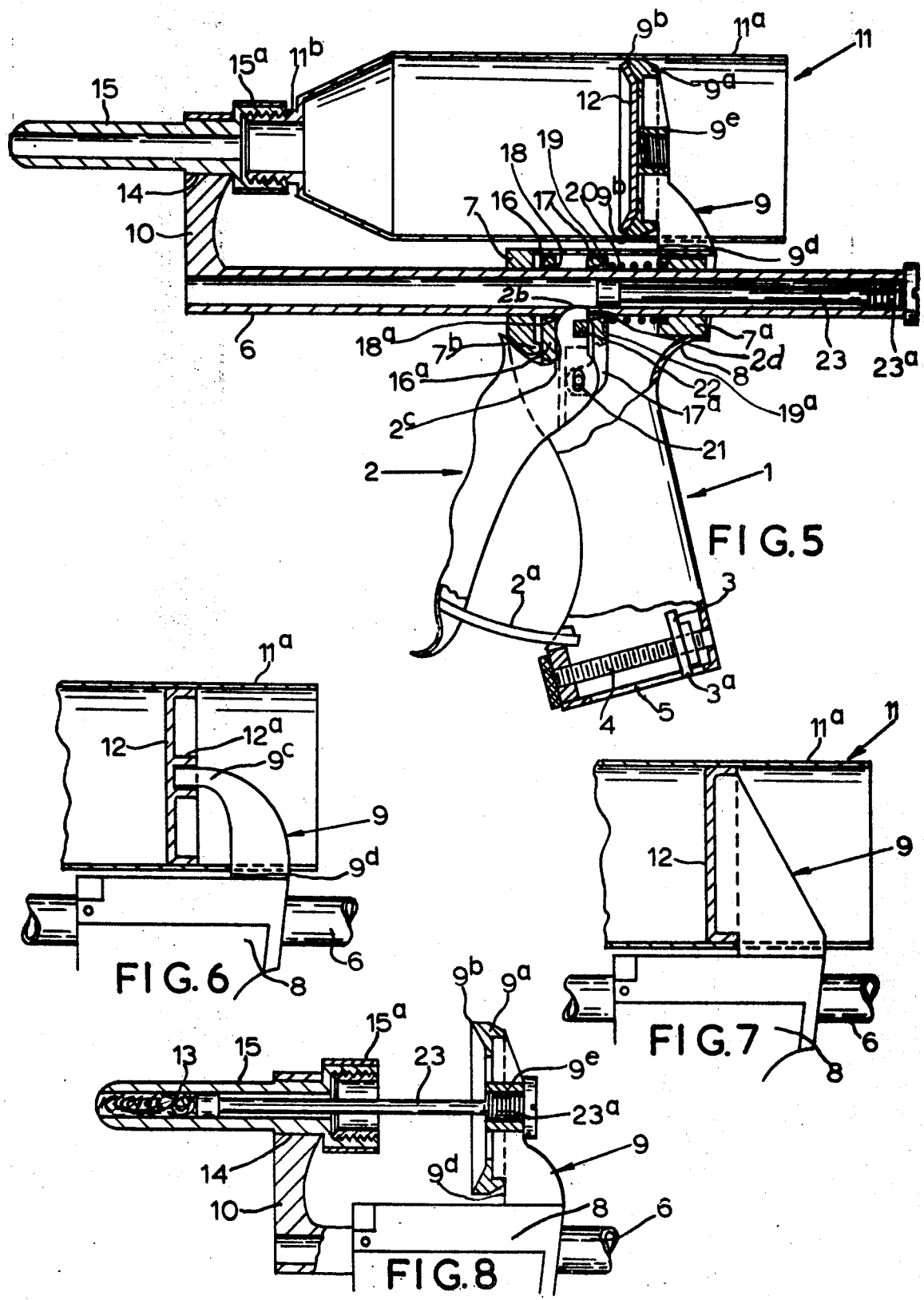

3,606,085
DISPENSING GUN FOR PASTES AND LIKE SUBSTANCES
Ian Butler Spilman, 46 Paynters Ave.,
New Plymouth, New Zealand
Filed Aug. 25, 1969, Ser. No. 852,607
Claims priority, application New Zealand, Aug. 26, 1968,
153,576
Int. Cl. B67d 5/22
U.S. Cl. 222—43                21 Claims

ABSTRACT OF THE DISCLOSURE

A dispensing gun for delivering substances such as pastes, for example for delivering medicinal pastes in the form of a drench to farm stock, the gun including a pistol butt handle with a support at its upper end and a carriage is slidably engaged in guides in the support. The forward end of the carriage is provided with an upstanding container holder for engagement with an outlet or dispensing nozzle for the container and the support has a thrust member upstanding therefrom and aligned with the forward container holder, such thrust member being arranged to co-operate with the piston member for expressing the contents of the substance container. The dispensing gun has a trigger associated with the handle and with carriage moving means so that manipulation of the trigger will move the carriage rearwardly relative to the handle and support so that in use the substance container is also moved rearwardly over a stationary piston and thrust member. Preferably the container is of the disposable kind and is constructed from an easily severable material such as a plastics material or a thin soft metal alloy material and the thrust member has a connecting part to the support with a sharpened forward edge capable of slitting the container lengthwise in permitting rearward movement of the container over the piston and thrust member, the piston being located forwardly of the sharpened connecting portion between the thrust member and support. The piston member for the container can be formed initially integrally with the walls of the container and be subsequently separable therefrom. The gun is also provided with an adjustable stop means to limit the trouble of the trigger relative to the handle in controlling the amount of paste to be dispensed from the container.

---

This invention relates to hand held and manipulated dispensing guns for delivering substances such as pastes and such as may be usable in the delivering of a quantity or volume of a medicinal material such as in giving a desired dosage of a drench to farm stock.

The object of this invention is to provide an improved piston or gun type of dispenser for delivering substances including means for controlling the amount of substance dispensed from a container or cartridge containing the substance and supported on the dispensing gun.

Another object of this invention is to provide a dispensing gun of the kind referred to and which is of relatively simple construction and is easily operated and adjustable in controlling the quantity or volume of substance to be delivered from a substance container or cartridge.

A still further object of this invention is to provide a dispensing gun of the kind referred to and which is arranged to be co-operable with a disposable container or cartridge for a substance.

Other objects and advantages of the invention will become apparent from the ensuing description.

According to this invention there is provided a dispensing gun comprising a handle mounting a support at its upper end, a thrust member mounted on the support and rising there above for engagement and co-operation with a piston member for expressing the contents of a substance container, guide means in the support, a carriage movable through the guide means and normally arranged to extend forwardly of the handle, a container holder mounted on the forward part of the carriage and arranged so that an outlet nozzle end part of the container may be held and supported between the forward container holder and the thrust member, a movable trigger associated with the handle, a carriage moving means associated with the carriage and operable by the trigger to move the carriage in the guide means a desired distance, the arrangement being such that squeezing the trigger into or towards the handle causes the carriage moving means to move the carriage with the container prescribed distance relative to the thrust member associated with the piston member for the container in delivering and dispensing a desired amount of substance from the container.

The invention will now be described by way of example and with reference to the accompanying drawings, in which:

FIG. 1 is a side elevational view of a preferred embodiment of the dispensing gun with a substance container mounted thereon;

FIG. 2 is a front end elevational view of the arrangement shown in FIG. 1;

FIG. 3 is a rear end elevational view of the arrangement shown in FIG. 1;

FIG. 4 is a part broken plan view at line IV—IV of FIG. 1;

FIG. 5 is an enlarged longitudinal section of the arrangement shown in FIG. 1;

FIG. 6 is a fragmentary sectional view illustrating a modification of the thrust member and piston member arrangement;

FIG. 7 is a fragmentary sectional view illustrating another modification of the thrust member and piston member arrangement, and FIG. 8 is a fragmentary sectional view of the preferred forward container holder and outlet nozzle for the container and illustrating the application of a further modification to the invention.

In the preferred form of this invention, the handle 1 is of hollow construction in the form of a pistol butt and a trigger member 2 is connected to the forward part of said handle 1 by a pivotal connection 22 so as to be cooperable therewith, and there is preferably an adjustable stop means at the base of the handle 1 whereby the limit of travel of the trigger member 2 relative to the handle 1 can be predetermined and adjusted according to a users or animals requirements. The adjustable stop means can comprise a removable pin or bolt arrangement but preferably, and as in the arrangement illustrated, the adjustable stop means includes a stop member 3 against which an inwardly extending portion or arm 2a of the trigger member 2 can abut, the stop member 3 being in threaded engagement with a screw adjuster 4 engaged with the base of the handle 1. Preferably the stop member 3 has a projecting indicator portion 3a extending into a slotted aperture 5 in the base of the handle 1 so as to be visible externally and the portion of handle 1 adjacent the aperture 5 can be graduated so that the desired stop position determining the travel of the trigger member 2, and thus quantity of substance to be disposed, can be ascertained.

The carriage 6 can be generally in the form of a rod or shaft slidably located in bores provided in front and rear guides, 7 and 7a respectively, in the support 8 provided at the upper part of the handle 1 and so that such rod like carriage 6 is normally arranged to extend forwardly from the handle 1 but may be moved lengthwise within the guides 7 and 7a.

A thrust member 9 is arranged to extend upwardly from the support 8 on the handle 1 and at the rear thereof and the forward part of the carriage 6 is provided with an upstanding container holder 10 in alignment with the thrust member 9 so that a container 11 which may be in the form of a cartridge can be located lengthwise of the dispensing gun between the container holder 10 and thrust member 9 and over the length of the carriage 6.

The arrangement is particularly intended for use with a disposable container or cartridge 11 which can be constructed from such as a polythene or like plastics material, or a relatively soft alloy metal material such as an aluminium alloy material, which may be manufactured relatively cheaply and can be easily cut or slit and is therefore disposable. It is intended that the container or cartridge 11 should be of generally uniform cross section through a major portion of its length with walls 11a and a restricted outlet 11b at one end with a base or end closure member 12 which is separate or can be severed from the container walls 11a so that when force is applied thereto it is capable of acting in the manner of a piston to force a substance 13 in the container 11 through the restricted outlet 11b. The container is preferably cylindrical.

In a preferred form of the invention therefore, the forward container holder 10 can be in the form of an upstand with an eye or aperture 14 within which a nozzle member 15 can be or is located. Such nozzle member 15 is of elongate formation and can be an extension of, and formed integrally with the outlet part 11b of the container 11 or, and as illustrated, can be constructed independently and have such as a screw engagement portion 15a arranged for screw threaded engagement with a complementary formed container outlet or neck 11b i.e. the screw threaded portion 15a of the nozzle member 15 may be similar in formation to a screw threaded closure cap (not shown) of the container or cartridge 11 initially provided, so that the container 11 can thus be engaged with the nozzle member 15 and supported at its forward end by the container holder 10. It is envisaged that the nozzle member 15 can be formed integrally with or fixedly secured to the forward container holder 10 on the carriage 6 but the removable nozzle member 15 is preferable so as to be replaceable or interchangeable with other nozzle members 15 and to facilitate sterilization after use. In a first preferred form of the invention, and as illustrated in FIGS. 3 and 5, the thrust member 9 can have a ring-like portion 9a of external diameter substantially the same as the internal of the container 11 to thus provide an adequate support against which the base or piston member 12 of the container 11 can bear; as a further modification of this first arrangement, the forward or leading peripheral edge 9b of the ring-like portion 9a of the thrust member 9 can be sharpened so as to be usable in severing a base piston member 12 which is initially formed integrally with or secured to the container walls 11a. In a second arrangement and as shown in FIG. 6, the thrust member 9 can include an upwardly and forwardly extending goose neck portion 9c with the upper forward part thereof forming a piston rod which is engageable with a formed recess or socket portion 12a at the rear of the base piston member 12 of the container 11. In a still further arrangement, and as illustrated in FIG. 7, the base piston member 12 can be secured to or formed integrally with the thrust member 9.

The base or connecting portion 9d of the thrust member 9 at the support is sharpened on its forward or leading side so as to provide a knife edge and the arrangement thus providing that, with a container 11 located on the dispensing gun, manipulation of the trigger 2 will cause the carriage 6 to move lengthwise rearwardly through the guides 7 and 7a of the support 8 and thus moving the container 11 rearwardly over the thrust member 9 and base piston member 12 for the container 11 causing a quantity of substance 13 contained within the container 11 to be dispensed through the container outlet 11b and nozzle member 15 extending therefrom, the amount or quantity of substance dispensed being determined by the amount of travel of the carriage 6. As the container 11 is moved rearwardly over the piston member 12 and the thrust member 9, the knife edge of the connecting portion 9d of such thrust member 9 will slit the lower side of the container wall 11a lengthwise in permitting the container 11 further rearward movement, the upper forward end portion of the thrust member 9 and the engaged piston being disposed ahead of the knife edge connection portion 9d of the thrust member 9.

Movement of the carriage 6 can be effected by at least one spring influenced gripping or binding member located on the carriage 6 and within the support 8 of the dispensing gun and which is movable and releasable from its binding position on the carriage 6 by manipulation of the trigger member 2. In the preferred arrangement illustrated there are provided both front and rear gripping members 16 and 17 respectively in the form of apertured plates with the carriage passing through the apertures (18 and 19 respectively) thereof, the aperture shapes and dimensions being such that the front gripping member 16 has a lower aperture edge part 18a which can bind on the carriage 6 to prevent forward movement of the carriage 6 and the rear gripping member 17 has a lower aperture edge part 19a which can bind on the carriage 6 when moved rearwardly by the trigger member 2 (as hereinafter described) to move the carriage 6 rearwardly therewith. The gripping members 16 and 17 are spring influenced, such as by a compression spring 20 located about the carriage and between the rear gripping member 17 and rear guide 7 of the support 8, so as to normally bind on the carriage 6.

The axes of the apertures 18 and 19 can be inclined in a vertical plane relative to and intersecting the axis of the carriage 6 so that when the gripping members 16 and 17 are inclined the aperture edge portions 18a and 19a are in non-binding relationship with the carriage 6, but when urged into or towards right angle positions relative to the carriage axis the edge portions 18a and 19a will bind on the carriage. Alternatively, the apertures 18 and 19 may have their axes at right angles to the planes of the gripping members 16 and 17 so that when the plate-like gripping members 16 and 17 are at right angles to the axis of the carriage 6 then the carriage 6 is freely movable therethrough but when such gripping members 16 and 17 are angled then the aperture edge portions 18a and 19a will bind on the carriage 6.

The gripping members 16 and 17 are arranged in spaced relationship and the trigger 2 has a rearward upwardly extending lug portion 2b which is locatable between the two gripping members 16 and 17, the rear gripping member 17 having a downwardly and forwardly extending portion 17a linked by a pivotal connection 21 to the trigger member 2 at a point below the pivotal connection 22 of the trigger 2 with the handle 1. For freedom of operation the trigger member 2 may be slotted for the reception of a pivot pin or bolt forming the pivotal connection 22 with the handle 1 and/or for the reception of a pivot pin forming the pivotal connection 22 with the rear gripping member 17.

The front gripping member 16 has a depending part 16a with a forward side arranged to bear against a rearwardly directed projection 7b on the forward guide 7 and forming a fulcrum point about which the front gripping member 16 may pivot to a limited degree, and the lug portion 2b of the trigger member 2 is arranged to normally bear on the rear face of the front gripping member depending part 16a at a point above the fulcrum projection 7b so that the gripping or binding aperture edge part 18a of the front gripping member 16 is urged into engagement with the carriage 6 to prevent, in particular, forward movement of the carriage 6 relative to the handle 1. The trigger lug portion 2b can be shaped and positioned relative to the front gripping member 16 so as to disengage or ease the pressure therefrom, or moved to exert pressure on the front gripping member 16 at a point below the fulcrum projection 7b so that when the trigger member 2 is squeezed towards and into the handle 1 about its pivotal connection 22 therewith, the front gripping member 16 is moved, or permitted to move, by the lug portion 2b of the trigger member 2 to the non binding position on the carriage 6. At the same time the rear gripping member 17 is moved rearwardly by its pivotal connection 21 with the trigger member 2 to effect rearward movement of the carriage 6, the influence of spring 20 and slight upward thrust of the trigger member 2 moving about its pivotal connection 22 maintaining the gripping or binding aperture edge part 19a of the rear gripping member 17 on the carriage, and thus rearward movement of the container 11 over the piston member 12 and thrust member 9. On release of pressure on the trigger member 2 the front gripping member 16 returns or is returned to the gripping or binding position on the carriage 6 and the rear gripping member 17 is released from binding on the carriage 6 to be moved forwardly to its original position ready for the next substance dispensing operation.

Further, to permit removal of an expended container 11 and fitment of a new container 11, as well as to facilitate assembly and dis-assembly of the dispensing gun, release means are provided to release the gripping members 16 and 17 from their binding positions on the carriage 6 and permit the carriage 6 to be slid forwardly, and out of if necessary, through the gripping members 16 and 17 and guides 7 and 7a. In one arrangement and as illustrated particularly in FIG. 5 of the drawings, the trigger member 2 can have a forward contact portion 2c just below the upper front gripping member contacting surface of the lug portion 2b and below the fulcrum projection 7b so that the front gripping member 16 can be contacted and pivoted to a limited degree about the projection 7b, and a non-binding position on the carriage 6, on pulling the trigger member 2 forwardly about its pivotal connection 22 with the handle 1. At the same time, the upper rear face 2d of the lug portion 2b will bear on the forward face of the rear gripping member 17 and tilt and move such rear gripping member 17 rearwardly against the influence of the spring 20 and into a non-binding position on the carriage 6.

In many instances a relatively long nozzle member will be required for the container or cartridge 11 and in a modification of the invention, and as shown by way of example in FIGS. 5 and 8 particularly, there is provided a plunger rod 23 which can be engaged with the thrust member 9 when the emptied container or cartridge 11 has been removed, the plunger rod 23 being arranged for location co-axially with the nozzle member 15 so that by continued operation of the dispensing gun the plunger rod 23 will move into the nozzle member 15 and discharge or dispense any of the substance 13 remaining in such nozzle member to thus eliminate waste. Such plunger rod 23 may have an enlarged screw threaded rear end 23a so as to be engageable with a complementary screw threaded central portion 9e of the thrust member in use (as in FIG. 8) and normally accommodated in the carriage when not in use (as in FIG. 5).

The invention as previously indicated, is particularly applicable to the dispensing of medicinal pastes or like substances such as when giving drenches to farm stock, although it will be appreciated that the invention is not confined to this aspect. Further, particular forms of invention has been described but it will be appreciated that other variations of and modifications to the invention may take place without departing therefrom.

It will be seen also that the device is easily portable and usable and that containers or cartridges of the substance may be readily replaced when emptied, with a fresh charged container or cartridge.

I claim:
1. A dispensing gun comprising a handle mounting a support at its upper end, a thrust member mounted on the support and rising thereabove for engagement and co-operation with a piston member for expressing the contents of a substance container, guide means in the support, a carriage movable through the guide means and normally arranged to extend forwardly of the handle, a container holder mounted on the forward part of the carriage and arranged so that an outlet nozzle end part of the container may be held and supported between the forward container holder and the thrust member, a movable trigger associated with the handle, a carriage moving means associated with the carriage and operable by the trigger to move the carriage in the guide means a desired distance, the construction providing that squeezing the trigger into or towards the handle causes the carriage moving means to move the carriage with the container a prescribed distance relative to the thrust member associated with the piston member for the container in delivering and dispensing a desired amount of substance from the container.

2. A dispensing gun as claimed in claim 1 wherein the handle is of hollow construction in the form of a pistol butt and a trigger member is connected to an upper forward part of said handle by a pivotal connection so as to be co-operable therewith and there is an adjustable stop means at and within the base of the handle whereby the limit of travel of the trigger member relative to the handle can be predetermined and adjusted.

3. A dispensing gun as claimed in claim 2 wherein the adjustable stop means comprises a stop member in screw threaded engagement with a screw adjustor engaged with the base of the handle and the trigger member has an inwardly extending portion or arm capable of abutting the stop member when the trigger member is moved inwardly towards the handle about its pivotal connection therewith.

4. A dispensing gun as claimed in claim 3 wherein the stop member has a projecting indicator portion extending into a slotted aperture in the base of the handle so as to be visible externally and the portion of the handle adjacent the aperture is graduated so that the desired stop position determining the travel of the trigger member can be ascertained.

5. A dispensing gun as claimed in claim 1 wherein the substance container is generally uniform in cross section throughout the major portion of its length with a restricted outlet at one end, being the forward end when located on the dispensing gun, and a nozzle member is provided for the said restricted outlet of the container; and the forward container holder is in the form of an upstand with an eye or aperture within which the nozzle member is locatable.

6. A dispensing gun as claimed in claim 5 wherein the nozzle member is constructed independently of the container and has a screw engagement portion arranged for screw threaded engagement with a complementary formed container outlet or neck, the screw threaded portion of the nozzle member being similar in formation to a screw threaded closure cap of the container initially provided.

7. A dispensing gun as claimed in claim 1 wherein the thrust member has a ring like portion of external diameter substantially the same as the internal diameter of the container in providing a support against which the piston member at the base of the container can bear.

8. A dispensing gun as claimed in claim 7 wherein the container is constructed from an easily severable material and has a base portion initially formed integrally with the walls of a cylindrical container, and the ring like portion of the thrust member has a forward or leading peripheral edge which is sharpened and is usable in severing the base portion from the walls of the container so that such base portion is usable as the piston member for the container.

9. A dispensing gun as claimed in claim 1 wherein the thrust member has an upwardly and forwardly extending gooseneck portion with the upper forward part thereof forming a piston rod which is engageable with a formed recess or socket portion at the rear of the piston member for the container.

10. A dispensing gun as claimed in claim 1 wherein the piston member for the container is fixedly secured to the thrust member.

11. A dispensing gun as claimed in claim 1 wherein the thrust member has a base or connecting portion at the support and which is sharpened on its leading forward side so as to provide a knife edge, the container being constructed from an easily severable material and the arrangement thus providing that, with a container located on the dispensing gun, manipulation of the trigger will cause the carriage to move lengthwise through the guide means of the support in moving the container rearwardly over the thrust member and piston member to dispense a quantity of substance contained within the container; such rearward movement of the container over the piston member and thrust member causes the knife edge connecting portion of the thrust member to slit the lower side of the container wall lengthwise in permitting the container further rearward movement, the piston member being disposed ahead of the knife edge connecting portion of the thrust member.

12. A dispensing gun as claimed in claim 1 wherein the carriage is in the form of a rod or shaft slidably located in bores provided in front and rear guides in the support provided at the upper part of the handle so that such rod like carriage is normally arranged to extend forwardly from the handle but can be moved lengthwise within the guides.

13. A dispensing gun as claimed in claim 12 wherein movement of the carriage is effected by at least one spring influenced gripping or binding member located on the carriage and within the support of the dispensing gun and which is movable and releasable from its binding position on the carriage by manipulation of the trigger.

14. A dispensing gun as claimed in claim 13 wherein front and rear gripping members in the form of apertured plates are provided, the rod like carriage passing through the apertures in the gripping members, the aperture shapes and dimensions being such that the front gripping member has a lower aperture edge part which can bind on the carriage to prevent forward movement of the carriage, and the rear gripping member has a lower aperture edge part which can bind on the carriage when moved rearwardly by the trigger to move the carriage rearwardly therewith and said gripping members being spring influenced so as to normally bind on the carriage.

15. A dispensing gun as claimed in claim 14 wherein a compression spring is located about the carriage and between the rear gripping member and the rear guide of the support.

16. A dispensing gun as claimed in claim 14 wherein the apertures of the gripping members have their axes inclined in a vertical plane relative to and intersecting the axis of the carriage so that when the gripping members are inclined the aperture edge portions are in non-binding relationship with the carriage, but when urged into or towards right angle positions relative to the carriage axis the aperture edge portions will bind on the carriage.

17. A dispensing gun as claimed in claim 14 wherein the gripping members are arranged in spaced relationship and the trigger has a rearward upwardly extending lug portion which is locatable between the two gripping members, the rear gripping member having a downwardly and forwardly extending portion linked by a pivotal connection to the trigger member at a point below a pivotal connection of the trigger with the handle, and the front gripping member having a depending part with a forward side arranged to bear against a projection disposed rearwardly of the forward guide and forming a fulcrum point about which the front gripping member may pivot to a limited degree; the lug portion of the trigger being arranged to normally bear and exert pressure on the rear face of the front gripping member depending part at a point above the fulcrum projection so that the gripping or binding aperture edge part of the front gripping member is urged into engagement with the carriage to prevent forward movement of the carriage relative to the handle, and the trigger lug portion being shaped and positioned relative to the front gripping member so as to relieve the pressure from the front gripping member at the point above the fulcrum projection when the trigger is squeezed towards and into the handle about its pivotal connection therewith in permitting the front gripping member to move to a non-binding position on the carriage whilst the rear gripping member is moved rearwardly engaging and moving the carriage rearwardly therewith.

18. A dispensing gun as claimed in claim 17 wherein the trigger has a forward contact portion just below the upper front gripping member contacting surface of the lug portion and below the fulcrum projection so that the front gripping member can be contacted and pivoted to a limited degree about the fulcrum projection and to a non-binding position on the carriage by pulling the trigger forwardly about its pivotal connection with the handle, the upper rear face of the lug portion being arranged to simultaneously bear on the forward face of the rear gripping member and tilt and move such rear gripping member rearwardly against the influence of the spring and into a non-binding position on the carriage.

19. A dispensing gun as claimed in claim 1 wherein a dispensing nozzle member is provided for the container and there is provided a plunger rod which is engageable with the thrust member when the container has been emptied of its contents and removed from the gun, said plunger rod being arranged for location co-axially with the nozzle member so that by continued operation of the dispensing gun the plunger rod will move into the nozzle member and discharge or dispense any of the substance remaining in such nozzle member.

20. A dispensing gun as claimed in claim 19 wherein the plunger rod as an enlarged screw threaded rear end which is arranged for screw threaded engagement with a complementary screw threaded central portion of the thrust member when in use and so as to be normally accommodatable in a bore of the carriage when not in use.

21. A dispensing gun as claimed in claim 1 wherein the substance container is generally cylindrical.

References Cited
UNITED STATES PATENTS

| | | | |
|---|---|---|---|
| 809,419 | 1/1906 | Belcher | 222—80 |
| 2,104,990 | 1/1938 | Hoefler | 222—309 |
| 2,717,101 | 9/1955 | Van Handel | 222—80 |
| 2,732,102 | 1/1956 | Ekins | 222—391X |
| 2,828,891 | 4/1958 | Murney | 222—80X |

M. HENSON WOOD Jr., Primary Examiner

E. D. GRANT, Assistant Examiner

U.S. Cl. X.R.

222—80, 327